July 31, 1923.
W. J. DAVIS
1,463,461
SANITARY PIPING AND FITTING THEREFOR
Filed Sept. 27, 1920   2 Sheets-Sheet 1
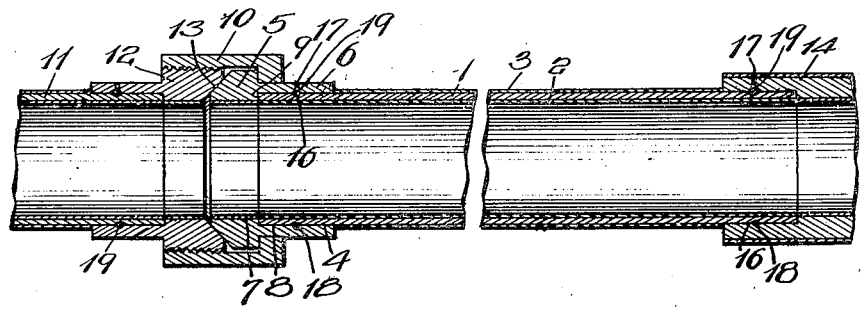
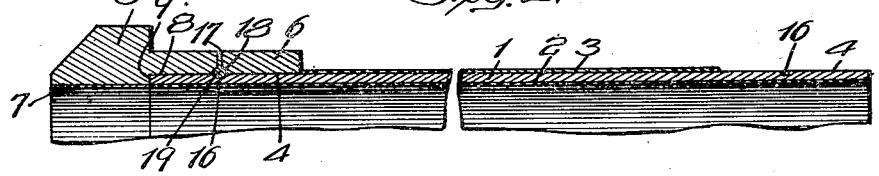
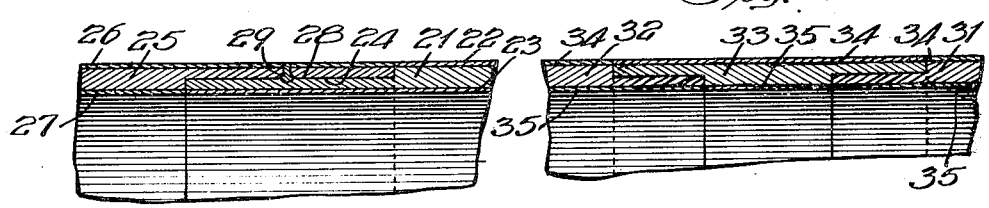
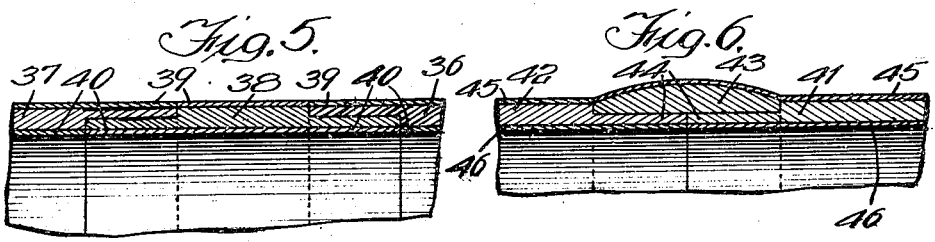
Witnesses:
W. F. Kilroy
Harry R. ...
Inventor:
William J. Davis
By ... Attys.

July 31, 1923.

W. J. DAVIS 1,463,461

SANITARY PIPING AND FITTING THEREFOR

Filed Sept. 27, 1920    2 Sheets-Sheet 2

Witnesses:
W. F. Kilroy
Harry R. White

Inventor:
William J. Davis
By Akee & Akee
Attys.

Patented July 31, 1923.

1,463,461

UNITED STATES PATENT OFFICE.

WILLIAM J. DAVIS, OF CHICAGO, ILLINOIS.

SANITARY PIPING AND FITTING THEREFOR.

Application filed September 27, 1920. Serial No. 413,209.

*To all whom it may concern:*

Be it known that I, WILLIAM J. DAVIS, a citizen of the United States, residing at Chicago, in the county of Cook and State of Illinois, have invented certain new and useful Improvements in Sanitary Piping and Fittings Therefor, of which the following is a description.

My invention belongs to that general class of devices known as piping and fittings therefor, and relates particularly to a sanitary piping and fitting which may be employed for conducting fluids, particularly those fluids which have a corroding effect on the piping or fittings. The invention has among its objects the production of devices of the kind described which are simple, convenient, durable, sanitary and efficient for use wherever found applicable. The same has particularly as an object the production of devices of the kind described which may be employed for conducting various fluids, which in their nature have a tendency to corrode and tarnish, and which must be handled in a sanitary way in order to prevent contamination of the fluids. The same is particularly intended to be used for conducting milk and cream in milk handling plants, as well as for use in connection with soda fountains and various places where fluids which may act on metal are to be conducted. Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts, Figure 1 is a sectional view through a portion of piping and fittings;

Fig. 2 is an enlarged view of a portion of the same;

Figs. 3, 4, 5 and 6 are sectional views illustrating modified constructions;

Figure 7:
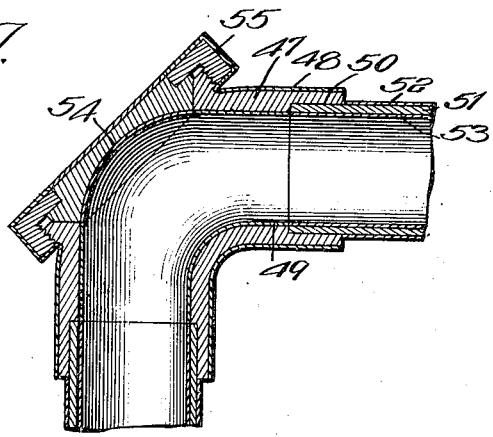
Fig. 7 is a sectional view illustrating one type of fitting and a portion of a pipe.

Referring to the drawings, and first particularly to Figs. 1 and 2, 1 represents a pipe of steel, iron or the like, of the desired size, shape and length, which is preferably glass or the like, enameled on the interior and exterior as indicated at 2 and 3. The enamel coating is a glass enamel finish which has been baked on at a high temperature so as to produce a durable, hard and non-porous coating so that the same will withstand the corroding action resulting from acids or the like in the fluid to be conducted through the pipe. The enameled finish is sanitary, as none of the fluid can corrode the iron or steel or like piping nor enter into the pores, and the same may be easily cleaned by flushing or by brushing or swabbing. In most cases, flushing with hot water or the equivalent, which may be employed for cleaning purposes, is sufficient to render the interior clean and sanitary. The same may be further sterilized with steam, if desired. I have illustrated in Fig. 1 how adjacent pipes or fittings may be secured together so as to provide a continuous conductor. As shown, 5 represents a fitting or part of a union or coupling which has a flanged portion 6 arranged to be secured to one end of the pipe. In the construction shown in Figs. 1 and 2, this is arranged to slip over the exterior of the pipe. As shown, the same fits over as indicated on the outside, the enamel having been first removed at 4, or the end of the pipe protected in the enameling so that the same is free from enamel. The end of the pipe and the fitting are both preferably thoroughly cleaned, and then plated or tinned in the usual manner and the coupling part slipped over the end and forced into place. Heat is then applied sufficient to weld the two parts together, that is to say, they are soldered together, and to all intents and purposes the fitting and pipe becomes a unitary structure, as the solder at 8 between the flange 6 and pipe and solder at 9 at the end makes a tight, substantially permanent fastening. In this connection, it may be mentioned that sufficient heat may be applied to sweat the two parts together without in any way injuring the enamel finish, as that will stand a higher degree of heat than is necessary for the sweating process. In tinning or plating the fitting and pipe, the same should be very thoroughly cleaned, and the same may be tinned by dipping or in any equivalent manner.

I have shown the adjacent pipe 11 having a cooperating union or coupling part or fitting 12 secured thereto in the manner similar to the securing of part 5 and the part 1. This part is arranged to be engaged by the part 10 which is mounted on the part 5, so that when the same is screwed into threaded engagement with part 12, the ends of the pipe are securely locked together. The meeting faces 13 of the two parts are formed to bear tightly against each other over a suitable area, so that when the coupling is tightened up, a leak proof joint is obtained. As shown, both of the coupling parts are enameled or nickel plated or otherwise coated so as to retard corrosion, and so that they may be easily cleaned. However, the pipes may be uncoupled and the fittings at the ends thoroughly cleaned where not enameled and without requiring much time. I have shown the opposite end of the pipe 1 provided with a fitting part 14, it being understood that this represents any style of fitting, the pipe being secured thereto in the manner described for securing of the coupling parts 5 and 12. Where desired, the ends of the pipe where they project into the fitting may be grooved as at 16, and if desired, the fitting may be correspondingly grooved as at 18, 17 being a hole in one side of the fitting extending to the groove, and through which solder or the equivalent may be allowed to flow. When heat is applied to the fitting, the solder in the groove tends to thoroughly seal the parts together in addition to the welding or soldering previously described, and it will be noted that this affords a very substantial lock, the fittings and pipes being securely fastened together.

I have illustrated modified connecting members in Figs. 3, 4, 5 and 6 which are more in the nature of a permanent connection rather than a detachable connection as previously described. Referring first to Fig. 3, 21 represents a pipe which may be enameled on the exterior and interior as at 22 and 23, the end, however, being formed as at 24 and thoroughly tinned. The adjacent pipe 25 is enameled on the exterior and interior as indicated at 26 and 27, and the same tinned on the inside as at 28. The parts are so proportioned that there is a substantially tight fit, so that when the two are formed together and welded or soldered, the same form substantially a unitary structure. The enamel coating on the interior is continuous. If desired, the parts may be grooved as indicated, and a solder or like ring 29 formed about the same.

In Fig. 4 pipes 31 and 32 are enameled as shown at 34 and 35 on the exterior and interior, as is also the coupling part 33. In this case, the coupling connects the two parts together in the same manner that the previous fittings were secured on the pipe, so that a substantially unitary structure is secured. In this case, the two pipe ends are constructed substantially similar to the end of the pipe 21. In Fig. 5 a slightly different style of coupling is shown, in which the two pipes 36 and 37 are constructed similar to the pipe 25 shown in Fig. 3, the coupling 38 in this case being secured to the inside of the pipes as described. The pipes and fittings are enameled on the exterior and interior as indicated at 39 and 40. The construction shown in Fig. 6 is similar to that shown in Fig. 4, except that the two pipes 41 and 42 abut with the fitting 43 surrounding the two and securing them together. The pipes and fittings are enameled as indicated at 45 and 46.

Figure 8:
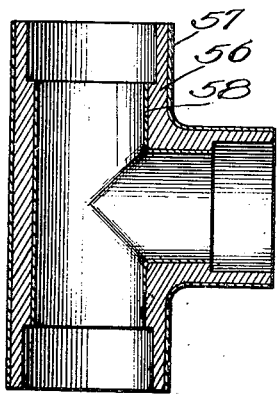
Fig. 8 is a sectional view illustrating another type of fitting.
Figure 9:
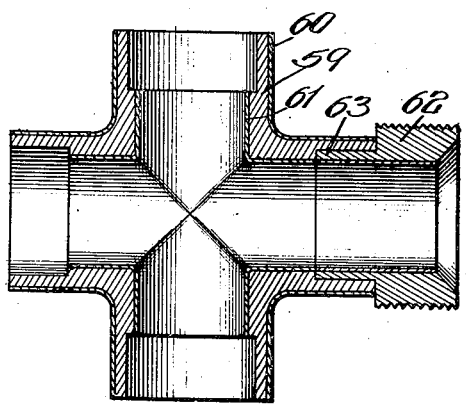
Fig. 9 is a similar view illustrating another type of fitting.

In Figs. 7, 8 and 9, I have shown several styles of fittings, for example, an angle or L, a T and a cross. Referring to the L, 47 is of suitable material which is enameled as indicated at 48 and 49, the same being constructed at 50, or in an equivalent manner, to receive the pipe 51, which is enameled on the exterior and interior at 52 and 53. The pipe 51 is secured to the L in the same manner as pipe 1 to the fitting or coupling part 5 shown in Fig. 1. It may be noted, however, that 51 may represent a coupling part as well as a pipe, so that the pipe may be detachably secured to the fitting. This particular fitting shown is provided with an opening which may be closed by a cap 54 or the equivalent, which is secured in place by the flange collar 55. The enameled pipe and fitting may be thoroughly cleaned out by removing the cap 54. In the T fitting shown in Fig. 8, the body 56 of suitable material is enameled on the exterior and interior as indicated at 57 and 58. The cross 57 is likewise finished as at 60 and 61. In this case I have shown a coupling part 62 formed with the end 63 extended into the coupling and secured thereto in the manner described.

It will be seen from the preceding that the enameled piping or piping and fittings may be connected together in an efficient and sanitary way, and more sanitary than the usual threaded pipe coupling, flange and gasket, or other methods of attaching. The fittings may be of any suitable material, such as steel or iron, brass, copper or Monel metal, or other suitable tinnable material. Either the ends of the pipes and enameled parts may be kept clear from enamel when the remaining portion is enameled, or the enamel may be cut from the parts after the same has been enameled. While the enamel is not so essential on the exterior, it is very desirable and is preferred. The parts are free from enamel where they are to fit together and treated and plated or tinned, and thence slipped together one within the other or against the other, or both, and sufficient heat is applied to weld or solder the two together without in any way injuring the enamel. As before mentioned, the heat required is considerably less than that at which the enamel would be injured. Where extra strength is required, the welding or soldering material may be run around the fitting or pipe as described. Practically all surfaces can be enameled, except the faces 13 of the fittings at the coupling or union, and in this case the coupling or union may be nickel plated or otherwise protected at points where the enamel is not desired. The advantages and sanitary features of the construction will be obvious to all of those having experience with the conducting of various fluids, such as milk or the like, which have a tendency to corrode or tarnish, and particularly those liquids which are used for food products or beverages which must be handled in a particularly sanitary way. The enamel will last indefinitely; consequently it is not necessary to continually have to have the pipes refinished. The same may be readily cleaned by flushing with hot water or boiling water, or sterilized with steam without in any way impairing the finish or injuring the system.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the kind described and in combination, a pipe enameled on the interior and exterior surfaces, the enamel on one surface being spaced back from the end and the surface of the exposed part tinned, a fitting constructed to fit said pipe at said exposed tinned surface and tinned thereat, the pipe and fitting being sweated together at said tinned faces to produce a soldered and substantially permanent joint thereat, said fitting enameled on one surface thereof so as to be perfectly flush with the correspondingly enameled surface of the pipe.

2. Two tubular parts constructed to snugly interengage and each enameled on the interior, except where the engaging surfaces of the parts come together, said engaging surfaces being tinned and said parts being assembled so that the end of one is encircled by the other to produce a substantially unitary structure, having their inner surfaces flush.

3. The process of preparing non-corrodible conducting pipe, consisting of enameling the interior of the pipe and a cooperating fitting, then removing a section of the enamel on the interior of the fitting and tinning the same, and tinning the end of the pipe at the exterior, then bringing the two parts together and permanently engaging them by applying heat to cause the soldering together of the parts.

4. The process of preparing non-corrodible conducting pipe, consisting in enameling the interior of the pipe and a cooperating coupling, then removing the enamel on the interior of the overlapping member the distance of the overlap, then bringing the two parts together and permanently securing them.

5. The process of preparing non-corrodible conducting pipe consisting in enameling the pipe on the exterior and interior, and similarly enameling a cooperating coupling, then removing the enamel at the exterior at the end of the pipe and on the section of coupling engaging the exterior of the pipe and soldering the two together at said sections.

6. The process of preparing non-corrodible conducting pipe consisting in enameling the pipe on the interior in the usual manner, and similarly enameling a cooperating fitting, then removing the enamel on the section of the fitting engaging the exterior of the pipe and sweating the two together at said section.

7. In a device of the kind described and in combination, a pipe enameled on the interior and exterior sides, the enamel on one side being spaced back from the end and the surface of the exposed part tinned, a fitting constructed to fit said pipe at said exposed tinned surface and tinned thereat, the pipe and fitting being sweated together at said tinned faces to produce a soldered and substantially permanent joint thereat, one of said parts grooved at the exposed face and provided with an opening to the outside of the part, and solder applied in said opening to provide a ring in the groove.

8. Two tubular parts constructed to interengage and each enameled on the interior, the enamel being removed where the engaging surfaces of the parts come together, and the parts being tinned before assembly and thereafter sweated together to produce a substantially unitary structure, said parts being constructed to provide a groove encircling the parts at said engaging surfaces, one part having an opening extending outwardly from said groove for the applying of solder to the said groove after the parts have been assembled.

9. Two tubular parts constructed to interengage and each enameled on the interior, the enamel being removed where the engaging surfaces of the parts come together, and the parts being tinned before assembly and thereafter sweated together to produce a substantially unitary structure, said parts being constructed to permit a substantial portion of solder to be arranged between the engaging faces.

In testimony whereof, I have hereunto signed my name in the presence of two subscribing witnesses.

WILLIAM J. DAVIS.

Witnesses:
 ROY W. HILL,
 BERTHA HARTMANN.